United States Patent [19]
Michelet et al.

[11] 3,811,050
[45] May 14, 1974

[54] INTERLOCKED POWER SUPPLY TRANSFER CIRCUIT TO INHIBIT SECONDARY TRANSFER AFTER A PRIMARY TRANSFER

[75] Inventors: Robert Wilson Michelet, Madison; Edward Jerome Silverman, Rockaway, both of N.J.

[73] Assignee: Bell Telephone Laboratories, Incorporated, Berkeley Heights, N.J.

[22] Filed: July 13, 1973

[21] Appl. No.: 379,059

[52] U.S. Cl. .................................................. 307/64
[51] Int. Cl. ........................................... H02h 11/00
[58] Field of Search ............ 307/64, 23, 82, 86, 92, 307/43; 340/333; 317/22; 322/45

[56] References Cited
UNITED STATES PATENTS
2,694,155  11/1954  Bates .................................. 307/64

Primary Examiner—Robert K. Schaefer
Assistant Examiner—M. Ginsburg
Attorney, Agent, or Firm—A. G. Steinmetz

[57] ABSTRACT

A transfer circuit to substitute a spare power supply for a failed one of a plurality of power supplies includes a logic circuit interlock arrangement to inhibit secondary transfers after the switching circuitry of the transfer circuitry has transferred the load from a first failed power supply to a spare power supply. The logic circuit interlock arrangement includes NAND gates and diode gates to complete an energy signal path to activate a transfer relay and apply inhibiting signals to disable subsequent energy signal paths and prevent secondary transfers.

5 Claims, 3 Drawing Figures

INTERLOCKED POWER SUPPLY TRANSFER CIRCUIT TO INHIBIT SECONDARY TRANSFER AFTER A PRIMARY TRANSFER

FIELD OF THE INVENTION

This invention relates to power supply transfer circuitry which transfers the load from a failed power supply to a spare power supply and, more particularly, to circuitry to inhibit further secondary transfers after a first transfer has occurred.

BACKGROUND OF THE INVENTION

In situations where the reliability of a power source is critical, it is customary to utilize a transfer circuit to transfer a load to a spare power supply should the primary power supply fail. The transfer circuitry monitors the power output of the primary power supply and, in response to a failure in the power output of the primary power supply, activates switching circuitry to substitute a spare power supply to maintain a continuing supply of power to the load. A simple transfer circuit arrangement to assure a continuing supply of power to a load is to connect two power supplies through a switching circuit to each load to be energized. The spare power supply may be substituted for the failed primary power supply and continuous power to the load is guaranteed. However, a one-to-one redundancy as such is uneconomical in that it requires a spare power supply for each primary power supply. Since one-to-one redundancy is undesirable for certain applications, a better solution is a transfer circuit which permits a single standby spare power supply to be substituted for a failed one of a plurality of operating power supplies. Such a transfer circuit includes switching circuitry to interconnect the individual loads of the primary power supplies with a single spare power supply. The sensing circuitry monitors each primary power supply and, in response to a failure thereof, substitutes the spare power supply for the failed primary power supply. Once a first substitution has been made, it is desirable to prevent any subsequent substitution since the spare power supply is already substituted for a first failed power supply. Hence, the transfer circuitry should be designed to prevent secondary transfers.

A typical transfer circuit to disconnect a failed one of a plurality of power supplies and substitute a spare power supply in its place is disclosed in U.S. Pat. No. 2,694,155 issued to B. W. Bates on Nov. 9, 1954. This patent discloses a transfer switching system in which a spare inverter circuit is substituted automatically for any one of four inverter circuits when it fails. This transfer switching circuitry is activated by one of a plurality of relays each responsive to the output of one of the inverters. When the relay responsive to any one inverter is activated to effect a changeover connection, a disabling circuit associated with that inverter is also activated in order to prevent subsequent activation of the transfer relays of the remaining three inverter circuits. This disabling function is accomplished by a relay lockout circuit through the use of mechanically interconnected contacts on the various relays so that the substitution of the spare inverter locks out any subsequent connections to another inverter. This lockout circuitry arrangement requires mechanical interconnections and multiple relay contacts. These mechanical interconnections increase the complexity of the relay arrangement and require added energy for operation of the relay.

It is therefore an object of this invention to monitor the output of a plurality of power supplies and substitute a spare power supply for a failed power supply.

It is another object of the invention to prevent the transfer switching circuit from subsequently operating once the spare power supply has been substituted for a first failed power supply.

It is yet another object of the invention to inhibit such subsequent transfers without the necessity of complex mechanical interconnections in the relay contacts of the transfer switching circuitry.

SUMMARY OF THE INVENTION

Therefore, according to the invention, a power supply transfer circuit comprises switching circuitry to substitute a spare power supply for a failed one of a plurality of separate power supplies. The switching circuitry is controlled by a logic type switching control arrangement which is responsive to a plurality of signal sensing circuits monitoring the output of each of the power supplies. The logic circuitry includes an interlock feature to prevent a secondary transfer once the first transfer has been made to substitute the spare power supply for a first failed power supply. The logic circuitry comprises a plurality of NAND gates each having an input coupled to the output of the sensing circuits which monitor the power supply outputs. The other input to the NAND gate is connected by diode gates to the outputs of each of the other NAND gates. Hence, the output of an activated NAND gate in response to a failed power supply performs a dual purpose and energizes a relay which operates relay switches to substitute a spare power supply and applies an inhibit signal to the remaining NAND gates to prevent a secondary transfer.

BRIEF DESCRIPTION OF THE DRAWING

The invention, its many objects, advantages, and features may be readily understood by reference to the detailed description hereinbelow and to the drawings in which.

DETAILED DESCRIPTION

Figure 1:
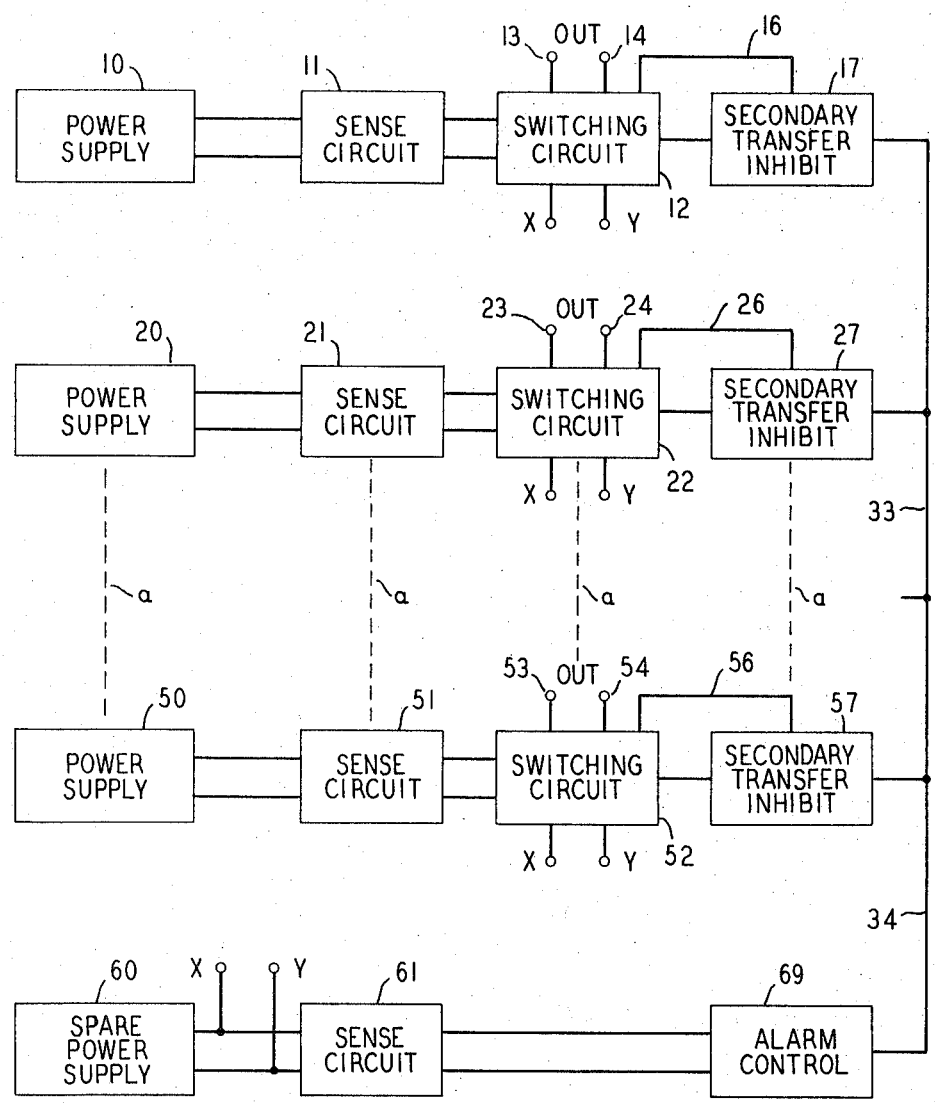
FIG. 1 is a block diagram of a transfer circuit to substitute a spare power supply for a failed one of a plurality of power supplies.

The transfer circuit shown in FIG. 1 is designed to monitor the output of a plurality of power supplies which comprise the power supply circuits, designated 10, 20, and 50. The transfer circuit transfers the output load of any one of the power supplies that fail to the spare power supply 60. The transfer circuit in FIG. 1 monitors the output of the power supplies 10, 20, and 50 by means of the sensing circuits 11, 21, and 51, respectively. The dotted line *a* between the power supplies 20 and 50, the sense circuits 21 and 51, the switching circuits 22 and 52, and the secondary transfer inhibit circuits 27 and 57 indicates that the transfer circuit may comprise an indefinite number of like circuit components therebetween.

The output of the power supply 10 is connected to a sense circuit 11, which in turn is connected to a switching circuit 12. The output terminals 13 and 14 of the switching circuit 12 are connected to a load which is to be energized by the power supply 10. Similarly, the power supplies 20 and 50 are connected, via the sense circuits 21 and 51 and the switching circuits 22 and 52, to the output terminals 23,24 and 53,54, respectively.

The spare power supply 60 is connected to a sense circuit 61 and from thence to an alarm circuit 69 which is utilized to monitor the operating condition of the spare power supply 60 and indicate the occurrence of a transfer. The output of the spare power supply 60 is applied to the output transfer terminals designated X and Y. These X and Y transfer terminals are connected to the X and Y input transfer terminals of each of the switching circuits 12, 22, and 52. Should the output of any of the power supplies 10, 30, or 50 fail, the related sense circuit responds to this failure and applies a signal to the related switching circuitry to activate relay circuitry therein which transfers the load from the failed power supply to the spare power supply which is connected through the switch circuit via the transfer terminals designated X and Y.

After a first transfer has been made, a subsequent power supply failure would normally cause the switching circuitry to be operated; but, since the spare power supply 60 is already being used, it would merely be placed in parallel with a second load. This resulting overload would probably cause the failure of the spare power supply 60.

The switching circuits 12, 22, and 52 are each connected to a secondary transfer inhibit circuit 17, 27, and 57, respectively. Each of the secondary transfer inhibit circuits is interconnected with each other via the lead 33. Once a first transfer has been effected, the secondary transfer inhibit circuit associated with the failed power supply applies a control inhibit signal to the remaining secondary transfer inhibit circuits. These remaining secondary transfer inhibit circuits apply an inhibit signal to prevent the operation of the remaining switching circuits. In the event the power supply 10 has failed, the secondary transfer inhibit circuit 17 applies a control inhibit signal to the secondary transfer inhibit circuits 27 and 57 and those in between, via lead 33. The secondary transfer inhibit circuits 27 and 57 apply inhibit signals via leads 26 and 56, respectively, to the switching circuits 22 and 52 to inhibit their further operation. The output of the secondary transfer inhibit circuit 17 is also applied via lead 34 to the alarm control circuit 69 which responds to provide an indication that a first power supply transfer has occurred.

Figure 2A:
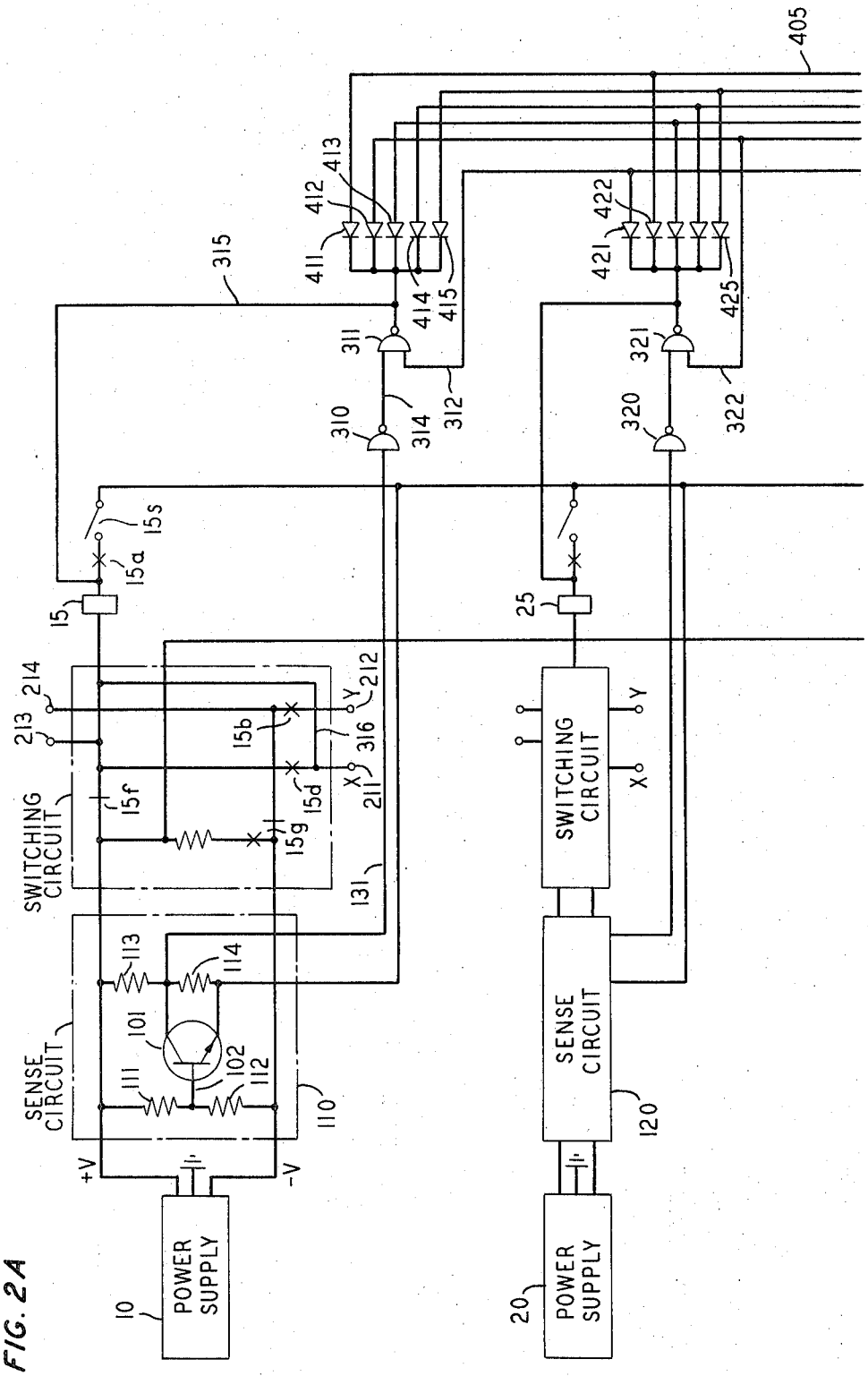
FIGS. 2A and 2B are a combined block, logic, and schematic diagram showing an embodiment of the transfer circuit of FIG. 1 in more detail.
Figure 2B:
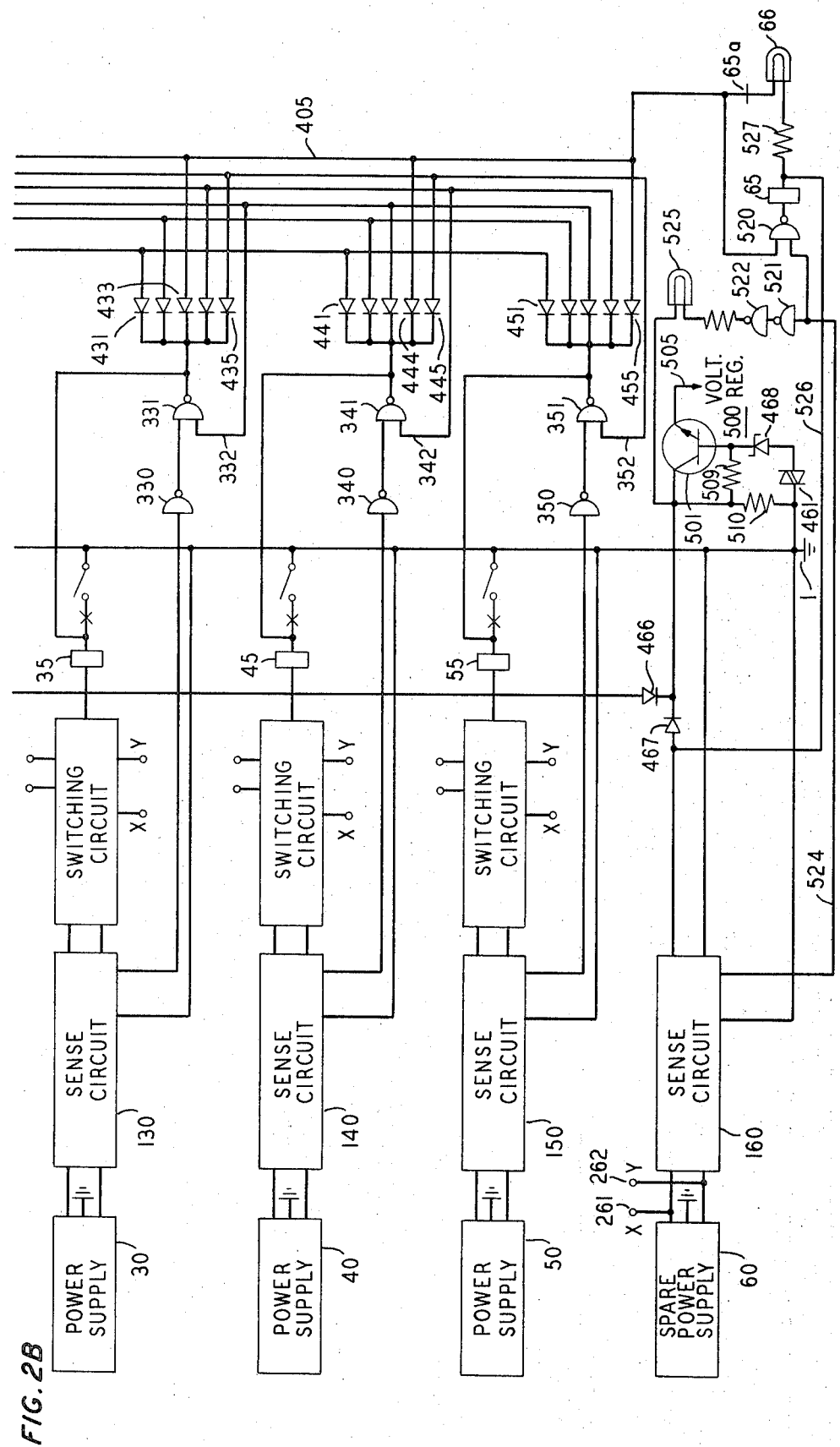

The transfer circuitry, as shown in detail in FIGS. 2A–2B, comprises five power supply circuits 10, 20, 30, 40, and 50, and one spare power supply circuit 60. The load of any one of the five power supply circuits which fail is transferred automatically to the spare power supply circuit 60. The output of the spare power supply 60 is also utilized, as shown, to supply the operating power to the switching and logic circuitry of the transfer circuit. The spare power supply 60 and the power supply 10 have their outputs connected via diodes 467 and 466, respectively, to power a voltage regulator 500. This voltage regulator 500 supplies the transfer circuitry operating power. The voltage regulator 500 includes a series regulating transistor 501, a reference voltage breakdown diode 468, and a varistor 461. A resistor 509 in combination with the breakdown diode 468 and the varistor 461 establishes a reference voltage to bias the transistor 501. The biased transistor 501 provides a regulated voltage output at the terminal 505. The terminal 505 is connected to energize the logic circuits of the transfer circuit. Since such connections are standard in the art, and the details of various logic circuits differ, it is not believed necessary to disclose these connections in detail since the connections will be readily apparent to those skilled in the art.

A resistor 510 shunting the output of the spare power supply 60 is utilized as a load to establish a minimum load current at the output terminals of the spare converter 60.

Each of the power supply circuits 10, 20, 30, 40, and 50, and the spare power supply 60 has its output monitored by the individual sense circuits 110, 120, 130, 140, 150, and 160, respectively. Should the output of any of the power supplies 10 through 50 deviate from its normal range, the respective sense circuit responds and activates the subsequent switching circuit which transfers the load to the spare power supply 60. The sense circuit 160 is utilized to activate an alarm should the spare power supply fail. The circuit detail of the sense circuit 110 is shown schematically. The remaining sense circuits are substantially identical in design and connections and hence are not shown in detail.

The output of each power supply in the illustrative embodiment comprises a positive and negative voltage. This example is not to be construed as limiting the scope of the invention as the invention may be utilized with many types of power supplies.

The sense circuit 100 includes a voltage divider which shunts the output of the power supply 10 to sense the negative voltage. This voltage divider comprises the resistors 111 and 112. The center tap of this voltage divider is connected to the base 102 of the transistor 101. A second voltage divider to sense the positive voltage comprises the resistors 113 and 114 and connects the positive output of the power supply 10 to the common ground of the power supplies and the transfer circuitry at node 1. The collector emitter path of the transistor 101 is shunted directly across the resistor 114. When the negative output of the power supply 10 is within its normal voltage range, it output signal biases the transistor 101 into a nonconducting state. With the transistor 101 nonconducting, and the positive power supply output within its normal range, a high voltage drop exists across the resistor 114. Hence, a high voltage is applied, via lead 131, to the input of the NAND gate 310. In describing the operation of the logic circuitry herein a high voltage or no current flow out of an input terminal is considered to be representative of a logic ONE signal and a low voltage or a current flow out of an input terminal to be representative of a logic ZERO signal. Hence, within this context these logic signals will be hereinafter referred to as ONE and ZERO.

Due to the high voltage across resistor 114, a ONE signal is applied to the input of NAND gate 310. In a similar fashion, if the power supplies 20, 30, 40, and 50 are operating normally, the sense circuits 120, 130, 140, and 150 apply a ONE signal to the input of NAND gates 320, 330, 340, and 350, respectively.

The output of the NAND gates 310, 320, 330, 340, and 350 is a ZERO signal which is applied to the input of the NAND gates 311, 321, 331, 341, and 351. The outputs of the NAND gates 311, 321, 331, 341, and 351 in response thereto are ONE signals, each of which is applied respectively to one terminal of an associated relay coil 15, 25, 35, 45, or 55. This ONE signal maintains the relay coil inactive since a high voltage signal is also applied to its other terminal and no current flows through the coil. Hence, no switching of a load from a power supply circuit to the spare power supply 60 occurs. The ONE output signal of NAND gate 311 also biases the diodes 411, 412, 413, 414, and 415 whose cathodes are connected to its output nonconducting. Similarly, the ONE output of NAND gate 321 biases diodes 421 through 425 nonconducting. The ONE input of NAND gate 331 biases diodes 431 through 435 nonconducting, the output of NAND gate 341 biases diodes 441 through 445 nonconducting, and the output of NAND gate 351 biases diodes 451 through 455 nonconducting. Similarly, a ONE signal appears at the input of NAND gate 520, via the anodes of the diodes 411, 422, 433, 444, and 455 which are biased nonconducting. This produce a ZERO at the output of NAND gate 520 which energizes the relay coil 65 and causes the contact 65a to open and maintain nonoperating an alarm lamp 66. The alarm lamp 66 remains extinguished as long as the power supplies 10, 20, 30, 40, and 50 are operating normally.

The output of power supply 60 through the sense circuit 160 is also applied, via lead 524, to the input of NAND gate 521. The NAND gate 521 has its output connected to the NAND gate 522 whose output in turn is connected to one terminal of a lamp 525. The other terminal of lamp 525 is connected to the voltage regulator 500. Should the spare power supply 60 fail, a voltage drop occurs across the lamp 525 since the output of power supply 10 maintains the normal output of the voltage regulator 500. Hence, the lamp 525 lights indicating the failure of the spare power supply 60. The cascaded NAND gates 521 and 522 serve to control the signal applied to the lamp 525.

The principles of operation of the transfer circuitry may be best explained by assuming the failure of one of the normally operating power supply circuits. For illustrative purposes herein, it is assumed that the power supply 10 fails and that its negative output signal falls below its normal operating range. A drop in the positive voltage output automatically drops the voltage at the node common to resistors 113 and 114. When the output of the power supply 10 fails and its negative output voltage drops, the resulting voltage at the center tap of the voltage divider comprising resistors 111 and 112 biases the transistor 101 into its saturated conducting condition. With the transistor 101 biased into its saturated conducting condition, the resistor 114 is essentially shorted and the voltage on lead 131 applied to NAND gate 310 drops to a ZERO value. As is apparent from the above description, a drop in the positive output of power supply 10 also causes a ZERO value to be applied to NAND gate 310. The output of NAND gate 310 is a ONE signal which is applied to the lead 314 connected to NAND gate 311. The input at lead 312 of NAND gate 311 is a ONE signal. In response to these two ONE signal inputs, the output of NAND gate 311 is a ZERO signal.

The output of NAND gate 311 is connected, via lead 315, to one terminal of the relay coil 15. The other terminal of the relay coil 15 is connected, via lead 316 and X-Y terminal 211, to the positive output X-Y terminal 261 of the spare power supply 60. Under normal operating conditions, the output of NAND gate 311 is a ONE, hence it is apparent that no voltage drop exists across the relay coil 15 and it is not energized. The ZERO signal output of NAND gate 311 in response to the failure of power supply 10 now provides a sufficient voltage drop to energize the relay 15. This voltage drop comes from the difference between the positive output of the spare power supply 60 at X-Y terminal 261 and the ZERO output of NAND gate 311. The voltage path begins at the positive output terminal 261 of the spare power supply 60 and continues through terminal 211, the relay coil 15, and lead 315 to the ZERO signal at the output of NAND gate 311. The current to energize the relay coil 15 flows from the positive output 261 of the spare power supply 60 to the ZERO output of NAND gate 311. If the spare power supply 60 has failed it is readily apparent that no transfer can occur. In response to the energization of the relay coil 15 the normally closed contacts 15f and 15g which connect power supply 10 to the output terminals 213 and 214 are opened. This disconnects the power supply 10 from its load. The normally open contacts 15d and 15b close in response to the energization of the relay coil 15. This connects the output of the spare power supply from its X-Y terminals 261 and 262 via the X-Y terminals 211 and 212 to the output terminals 213 and 214.

The energization of the relay coil 15 closes the normally open contact 15a and connects its low voltage terminal to ground at node 1. This assures that the relay coil 15 will remain energized until the normally closed switch 15s is opened.

The power supplies 20, 30, 40, and 50 are still operating normally; hence the inputs to the NAND gates 320, 330, 340, and 350 are ONE signals. Consequently, the outputs of the NAND gates 321, 331, 341, and 351 are ONE signals and the relay coils 25, 35, 45, and 55 are not energized.

Once the spare power supply 60 has been substituted for a failed power supply, the transfer circuitry is inhibited from making a subsequent substitution of the spare power supply 60 for a second failed power supply as long as the first failed power supply remains in a failed condition. The transfer circuitry here is connected to prevent any subsequent transfer, should one of the power supplies 20, 30, 40, or 50 subsequently fail, by inhibiting the energization of the relays 25, 35, 45, and 55. Only a first substitution of the spare power supply can be made for a failed one of the power supplies. The energization of the relays 25, 35, 45, and 55 is prevented by constraining the outputs of the NAND gates 321, 331, 341, and 351 to remain at a ONE signal level irrespective of any failure of the power supplies 20, 30, 40, and 50. This constraint is accomplished in the illustrated example by utilizing the ZERO output of NAND gate 311 to maintain the outputs of NAND gates 321, 331, 341, and 351 at a ONE level. The cathode terminals of a plurality of diodes 411, 412, 413, 414, and 415 are connected in common to the output of NAND gate 311. The anode terminals of the diodes 412, 413, 414, and 415 each connect the output of NAND gate 311, via leads 322, 332, 342, and 352 to the second input of each of the other NAND gates 321, 331, 341, and 351 of the transfer circuitry, respectively. For example, the anode of diode 412 is connected, via lead 322, to the input of NAND gate 321. Since the lead 322 has a ZERO state signal applied to it, the output of NAND gate 321 is maintained at a ONE signal level irrespective of the output state of NAND gate 320 and hence no energizing voltage differential is applied across the relay coil 25. It is readily apparent from inspection of FIGS. 2A and 2B that the output of each of the remaining NAND gates 331, 341, and 351 is constrained to be a ONE signal.

The anode terminal of diode 411 is connected via lead 405 to an input of NAND gate 520 and to relay contact 65a. The relay contact 65a is normally closed when relay coil 65 is unenergized and opens when the relay coil 65 is energized. The diode 411 is forward-biased by the ZERO output of NAND gate 311 due to the failure of power supply 10. This ZERO signal is applied to NAND gate 520 and produces a ONE at a first terminal of relay 65. The other terminal of relay 65 is connected, via lead 526, to the positive output of the power supply 60. Hence the relay 65 id deenergized and the relay contact 65a closes in response thereto. The ZERO output of NAND gate 311 is applied to one terminal of lamp 66. The other terminal of lamp 66 is coupled, via resistor 527, to the positive output of the spare power supply 60. This voltage differential energizes the lamp 66 thereby indicating the substitution of the spare power supply 60 for the failed power supply 10. When power supply 10 is reactivated, the relay coil 65 will again be energized, opening contact 65a and turning off the lamp 66. The diodes 422, 433, 444, and 455 each connect NAND gates 321, 331, 341, and 351 to NAND gate 520 and perform the same lamp-lighting function as does diode 411.

It is apparent from the foregoing description that a load cannot be transferred by the transfer circuit from a failed power supply to a spare power supply after a first substitution has been made. After a replacement power supply has been substituted for the failed power supply the load may be switched from the spare power supply to the replacement merely by deactivating the associated relay coil. For example, deactivation to reconnect power supply 10 to the load is accomplished by opening the switch 15s which breaks the continuous circuit from the spare power supply through the relay coil to ground. This deactivates all the relay contacts energized by relay coil 15 and reconnects the load at output terminals 213 and 214 to the regular power supply position of power supply 10.

While the foregoing description describes a transfer circuit with five power supplies and one spare power supply, the principles of the invention permit its application to other combinations of power supplies and spare power supplies. The sense circuit may be designed to be responsive to different power supply parameters than those described without departing from the spirit and scope of the invention.

What is claimed is:

1. A transfer circuit including first coupling means to accept at least a first and a second power supply, means connected to said first coupling means to sense a failed power supply, second coupling means to accept a spare power supply, switching means connected to said first and second coupling means to substitute a spare power supply for a failed one of said first and second power supplies, and means to inhibit a second substitution subsequent to a first substitution, including gating means associated with each of said first and second power supplies and having a first and second input, said first input responsive to said means to sense, an output of each of said gating means being coupled by individual unidirectional coupling means to said second input of each of the other gating means, and the output of each of the gating means being coupled to operate said switching means, whereby an output signal of one of said gating means activating said switching means additionally controls a signal output of the other of said gating means to inhibit a second substitution by disabling the operation of said switching means.

2. A transfer circuit as defined in claim 1 wherein said switching means includes a relay coil responsive to the signal output of said gating means and switching contacts response to the relay coil to transfer a load from the failed one of said first and second power supplies to the spare power supply.

3. A transfer circuit as defined in claim 1 wherein said gating means each comprises series-connected first and second NAND gates, said first input connected to the first NAND gate, said second input connected to the second NAND gate, the output of each of said second NAND gates being connected to a first terminal of a plurality of diodes each connected to a common junction, the second terminals of each of said diodes being connected to said second input of the second NAND gates associated with other power supplies.

4. A power supply transfer circuit to substitute a spare power supply for an inactive one of a plurality of active power supplies comprising a plurality of input means to accept power supplies, each of said input means including switching means to disconnect therefrom one of said power supplies which becomes inactive and connect in its place the spare power supply, signal sensing means to monitor the output of each of said active power supplies, control circuit means to activate said switching means in response to said signal sensing means, said control circuit means comprising a plurality of sets of NAND gates having input and output terminals, each set of said NAND gates corresponding to each one of said input means, one input terminal of each set of said NAND gates being connected to said signal sensing means, the output terminal of each set of said NAND gates being connected to operate said switching means, and to a diode gate, each diode gate comprising a plurality of diodes interconnecting a second input terminal of each set of said NAND gates to the output terminal of each set of the remaining NAND gates of said plurality of NAND gates, whereby the output of a NAND gate is utilized to switch a spare power supply in place of an inactive power supply and inhibit any subsequent substitution for another subsequent inactive power supply.

5. A power supply transfer circuit as defined in claim 4 wherein each diode gate includes a first diode connected to activate an alarm circuit, the alarm circuit comprising a lamp having one terminal connected to said spare power supply and another terminal coupled to said diode.

* * * * *

UNITED STATES PATENT OFFICE
CERTIFICATE OF CORRECTION

Patent No. 3,811,050                 Dated May 14, 1974

Inventor(s) Robert Wilson Michelet and Edward Jerome Silverman

It is certified that error appears in the above-identified patent and that said Letters Patent are hereby corrected as shown below:

On the Title Page after "Assignee: Bell Telephone Laboratories, Incorporated" change "Berkeley Heights" to --Murray Hill--. Column 4, line 32, the reference numeral "100" should be changed to --110--. Column 5, line 13, change "input" to --output--; line 20, change "produce" to --produces--. Column 7, line 17, change "id" to --is--. Column 8, line 17, change "response" to --responsive--.

Signed and sealed this 17th day of September 1974.

(SEAL)
Attest:

McCOY M. GIBSON JR.
Attesting Officer

C. MARSHALL DNN
Commissioner of Patents